US011648818B2

United States Patent
Hasegawa

(10) Patent No.: US 11,648,818 B2
(45) Date of Patent: May 16, 2023

(54) AIR-CONDITIONING SYSTEM

(71) Applicant: Mitsubishi Electric Corporation, Tokyo (JP)

(72) Inventor: Hajime Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 16/642,586

(22) PCT Filed: Oct. 27, 2017

(86) PCT No.: PCT/JP2017/038977
§ 371 (c)(1),
(2) Date: Feb. 27, 2020

(87) PCT Pub. No.: WO2019/082395
PCT Pub. Date: May 2, 2019

(65) Prior Publication Data
US 2020/0346511 A1 Nov. 5, 2020

(51) Int. Cl.
*B60H 1/00* (2006.01)
*B60H 3/00* (2006.01)
*B60H 3/06* (2006.01)

(52) U.S. Cl.
CPC .......... *B60H 1/008* (2013.01); *B60H 3/0085* (2013.01); *B60H 1/00785* (2013.01); *B60H 3/06* (2013.01); *B60H 2003/0683* (2013.01)

(58) Field of Classification Search
CPC .... B60H 1/008; B60H 1/00785; B60H 1/039; B60H 1/00849; B60H 3/0085; B60H 3/06; B60H 2003/0683

(Continued)

(56) References Cited

U.S. PATENT DOCUMENTS 4,412,425 A * 11/1983 Fukami .............. B60H 1/00021
62/244
5,876,277 A * 3/1999 Uemura ............. B60H 1/00849
454/158

(Continued)

FOREIGN PATENT DOCUMENTS

CN 104566663 A 4/2015
FR 2976853 A1 12/2012

(Continued)

OTHER PUBLICATIONS

International Search Report for PCT/JP2017/038977 dated Jan. 9, 2018 [PCT/ISA/210].

(Continued)

*Primary Examiner* — Steven B McAllister
*Assistant Examiner* — Charles R Brawner
(74) *Attorney, Agent, or Firm* — Sughrue Mion, PLLC; Richard C. Turner

(57) ABSTRACT

Provided is an air-conditioning system including: an air pollution level detector configured to detect each of a pollution level of outside air, which is air outside a vehicle, and a pollution level of inside air, which is air inside the vehicle; and an air-conditioning control device configured to control air conditioning by switching an air-conditioning mode of the vehicle between an inside-air circulation mode and an outside-air introduction mode. The air-conditioning control device switches the air-conditioning mode from the outside-air introduction mode to the inside-air circulation mode based on the pollution level of the outside air acquired from the air pollution level detector, and switches the air-conditioning mode from the inside-air circulation mode to the outside-air introduction mode based on the pollution level of the inside air acquired from the air pollution level detector.

11 Claims, 4 Drawing Sheets

(58) Field of Classification Search
USPC .......................................................... 454/75
See application file for complete search history.

(56) References Cited

U.S. PATENT DOCUMENTS

| | | | |
|---|---|---|---|
| 2007/0227358 A1 | 10/2007 | Takigawa et al. | |
| 2012/0015594 A1 | 1/2012 | Yenneti et al. | |
| 2014/0262132 A1* | 9/2014 | Connell | B60H 1/00457 165/96 |
| 2015/0017900 A1* | 1/2015 | Baek | B60S 1/023 454/75 |
| 2015/0360544 A1* | 12/2015 | Fruehsorger | A61L 9/22 96/19 |
| 2016/0176261 A1* | 6/2016 | Khorana | B60H 1/00821 62/126 |
| 2017/0113517 A1 | 4/2017 | Kwon et al. | |
| 2017/0136848 A1* | 5/2017 | Trutnovsky | B60H 1/008 |
| 2017/0182861 A1* | 6/2017 | Steinman | B60H 1/00028 |
| 2017/0274737 A1* | 9/2017 | Delaruelle | B60H 1/00985 |
| 2018/0056941 A1* | 3/2018 | Won | B60S 1/026 |
| 2018/0057013 A1* | 3/2018 | Mullett | B60H 1/267 |
| 2018/0244129 A1* | 8/2018 | Whitens | G01J 5/0037 |
| 2019/0283529 A1* | 9/2019 | Macneille | B60H 1/00771 |
| 2020/0180387 A1* | 6/2020 | Sarma | B60H 1/00007 |

FOREIGN PATENT DOCUMENTS

| | | |
|---|---|---|
| JP | 07-037731 U | 7/1995 |
| JP | 2005-145340 A | 6/2005 |
| JP | 2007-290690 A | 11/2007 |
| JP | 2011-161984 A | 8/2011 |
| JP | 2012-187987 A | 10/2012 |
| JP | 2014-019346 A | 2/2014 |
| JP | 2016-155516 A | 9/2016 |
| JP | 2017-105284 A | 6/2017 |
| KR | 10-2009-0094978 A | 9/2009 |
| WO | 2017/046148 A1 | 3/2017 |

OTHER PUBLICATIONS

Extended European Search Report dated Oct. 16, 2020 from the European Patent Office in Application No. 17929807.0.

* cited by examiner

AIR-CONDITIONING SYSTEM

CROSS REFERENCE TO RELATED APPLICATIONS

This application is a National Stage of International Application No. PCT/JP2017/038977 filed Oct. 27, 2017.

TECHNCIAL FIELD

The present invention relates to an air-conditioning system, which is to be mounted to a vehicle, and is configured to be able to switch air conditioning inside the vehicle between circulation of inside air and introduction of outside air from one to another.

BACKGROUND ART

Hitherto, as a ventilation device to be mounted to a vehicle, there has been proposed a device configured to perform control of ventilating an inside of a vehicle by detecting a concentration of carbon dioxide contained in air inside the vehicle, and, based on a result of the detection, introducing outside air into the inside of the vehicle and discharging inside air to an outside of the vehicle (see, for example, Patent Literature 1).

CITATION LIST

Patent Literature

[PTL 1] JP 2014-19346 A

SUMMARY OF INVENTION

Technical Problem

In the related art described in Patent Literature 1, the above-mentioned control, that is, the introduction of the outside air, is performed without taking pollution of the outside air into consideration. Accordingly, when the outside air is polluted, the polluted outside air is introduced into the inside of the vehicle. In this case, there has been a problem in that comfortability inside the vehicle is impaired because the polluted outside air is introduced into the inside of the vehicle.

The present invention has been made in order to solve the above-mentioned problem, and has an object to provide an air-conditioning system configured to implement air-conditioning control capable of achieving improvement of comfortability inside a vehicle.

Solution to Problem

According to one embodiment of the present invention, there is provided an air-conditioning system, which is to be mounted to a vehicle, the air-conditioning system including: an air pollution level detector configured to detect each of a pollution level of outside air, which is air outside the vehicle, and a pollution level of inside air, which is air inside the vehicle; and an air-conditioning control device configured to control air conditioning by switching an air-conditioning mode of the vehicle between an inside-air circulation mode, in which the inside air is circulated, and an outside-air introduction mode, in which the outside air is introduced into an inside of the vehicle and the inside air is discharged to the outside of the vehicle, wherein the air-conditioning control device is configured to: compare, when the air-conditioning mode is the outside-air introduction mode, the pollution level of the outside air acquired from the air pollution level detector with an outside-air pollution level threshold value for determining whether to switch the air-conditioning mode from the outside-air introduction mode to the inside-air circulation mode, and when the pollution level of the outside air exceeds the outside-air pollution level threshold value, switch the air-conditioning mode from the outside-air introduction mode to the inside-air circulation mode; and compare, when the air-conditioning mode is the inside-air circulation mode, the pollution level of the inside air acquired from the air pollution level detector with an inside-air pollution level threshold value for determining whether to switch the air-conditioning mode from the inside-air circulation mode to the outside-air introduction mode, and when the pollution level of the inside air exceeds the inside-air pollution level threshold value, switch the air-conditioning mode from the inside-air circulation mode to the outside-air introduction mode.

ADVANTAGEOUS EFFECTS OF INVENTION

The air-conditioning system according to the present invention is configured to switch the air conditioning inside the vehicle between the circulation of the inside air and the introduction of the outside ail from one to another, based on the detection result obtained by the air pollution level detector configured to detect each of the pollution level of the outside air and the pollution level of the inside air. Kith this configuration, it is possible to provide the air-conditioning system configured to implement air-conditioning control capable of achieving improvement of comfortability inside the vehicle.

DESCRIPTION OF EMBODIMENTS

Now, an air-conditioning system according to each of exemplary embodiments of the present invention is described with reference to the accompanying drawings. In the illustration of the drawings, the same components are denoted by the same reference symbols, and the overlapping description thereof is herein omitted.

First Embodiment

Figure 1:
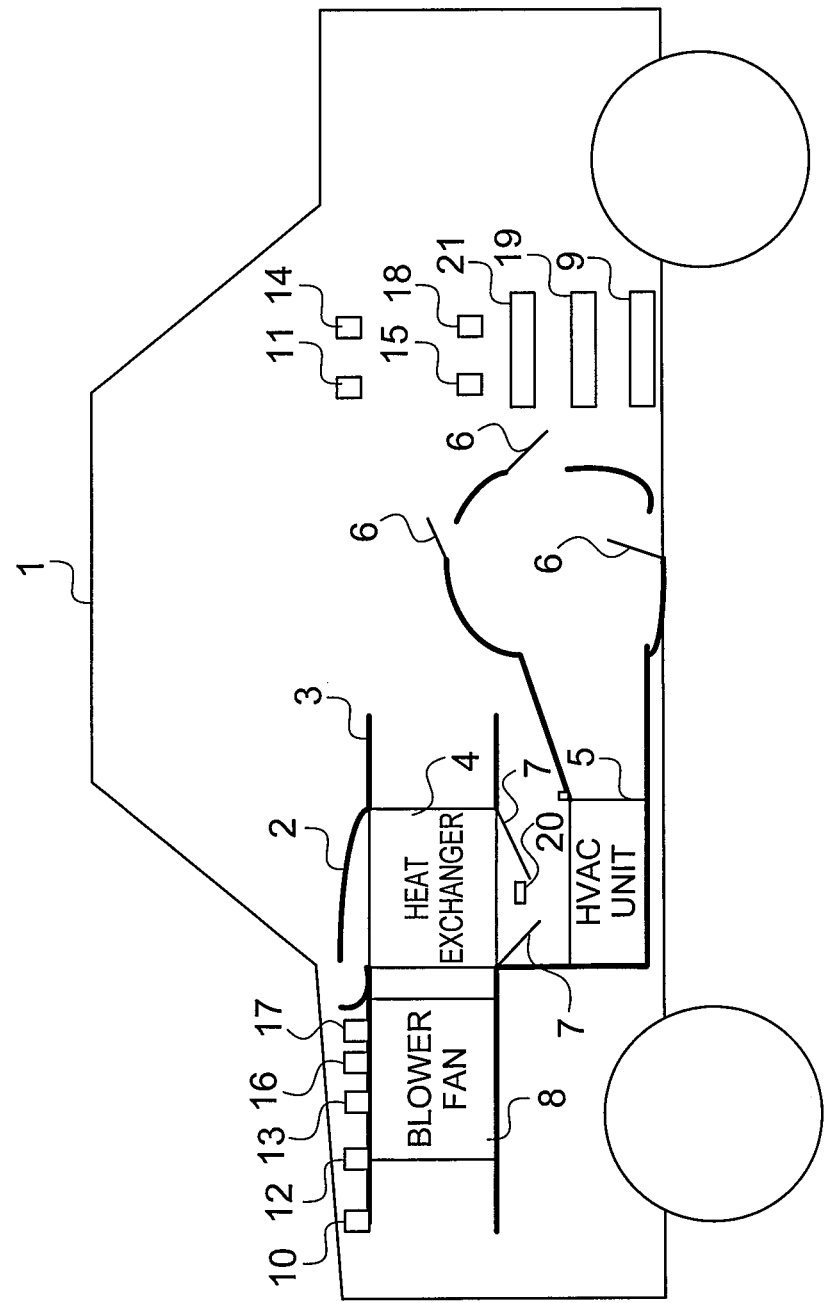
FIG. 1 is a configuration diagram for illustrating a vehicle to which an air-conditioning system according to a first embodiment of the present invention is mounted.
Figure 2:
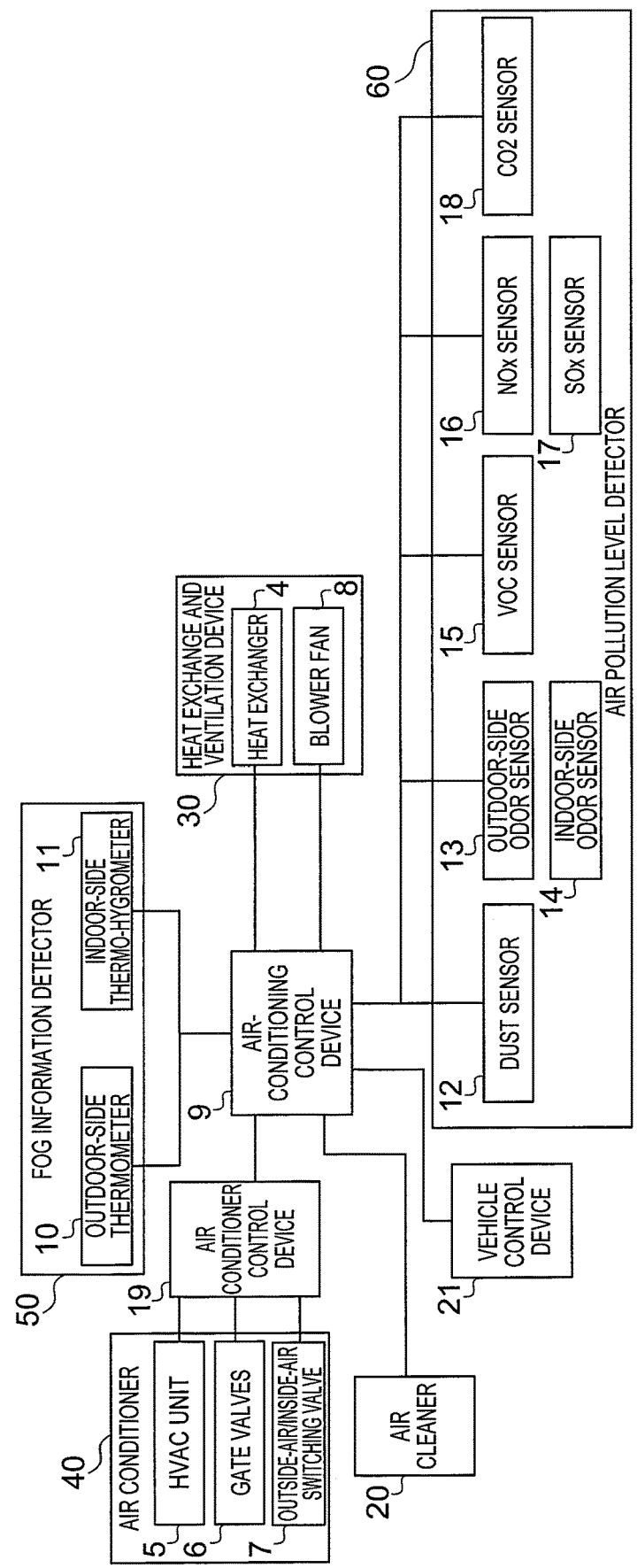
FIG. 2 is a configuration diagram for illustrating the air-conditioning system according to the first embodiment of the present invention.

FIG. 1 is a configuration diagram for illustrating a vehicle 1 to which an air-conditioning system according to a first embodiment of the present invention is mounted. FIG. 2 is a configuration diagram for illustrating the air-conditioning system according to the first embodiment of the present invention In FIG. 1 and FIG. 2, the air-conditioning system includes: an air-supply passage 2; an exhaust passage 3; a heat exchange and ventilation device 30 including a heat, exchanger 4 and a blower fan 8; an air conditioner 40 including an HVAC unit 5, gate valves 6, and an outside-air/inside-air switching valve 7; an air-conditioning control device 9; a fog information detector 50 including an outdoor-side thermometer 10 and an indoor-side thermo-hygrometer 11; an air pollution level detector 60 including a dust sensor 12, an outdoor-side odor sensor 13, an indoor-side odor sensor 14, a VOC sensor 15, a NOx sensor 16, a SOx sensor 17, and a CO2 sensor 18; an air conditioner control device 19; an air cleaner 20; and a vehicle control device 21.

The air-supply passage 2 is an air passage for supplying air outside the vehicle 1 (hereinafter referred to as "outside air") to an inside of the vehicle 1 when an air-conditioning mode is an outside-air introduction mode. The exhaust passage 3 is an air passage for discharging air inside the vehicle 1 (hereinafter referred to as "inside air") to the outside of the vehicle 1 when the air-conditioning mode is the outside-air introduction mode.

In this manner, when the air-conditioning mode is an inside-air circulation mode, the inside air is circulated inside the vehicle, and when the air-conditioning mode is the outside-air introduction mode, the outside air is introduced into the inside of the vehicle 1 and the inside air is discharged to the outside of the vehicle 1.

The heat exchanger 4 exchanges heat between the outside air introduced into the inside oil the vehicle 1 and the inside air discharged to the outside of the vehicle 1, when the air-conditioning mode is the outside-air introduction mode. In ether words, when the air-conditioning mode is the outside-air introduction mode, the heat exchanger 4 exchanges heat between air supplied from the outside of the vehicle 1 to the air-supply passage 2 and air discharged from the inside of the vehicle 1 to the exhaust passage 3. For example, the heat exchanger 4 brings air flowing into the heat exchanger 4 from an outlet of the air-supply passage 2 and air flowing into the heat exchanger 4 from an inlet of the exhaust passage 3 into contact, with each other by causing the former air and the latter air to cross or face each other, to thereby exchange heat therebetween.

The heating, ventilation, and air conditioning (HVAC) unit 5 is formed by a refrigerant heat exchanger (not shown) configured to exchange heat between refrigerant and air, and a blower fan (not shown) configured to cause the air subjected to heat exchange to flow from the refrigerant heat exchanger through the inside of the vehicle 1. The blower fan of the HVAC unit 5 is configured to be able to compensate for a pressure loss of the heat exchanger 4. In order to compensate for the pressure loss of the heat exchanger 4, the blower fan of the HVAC unit 5 may be upsized, or an additional far. may be provided.

Each of the gate valves 6 has an opening/closing degree to be adjusted so that an opening/closing operation is performed, by a servo motor (not shown) being driven in accordance with control from the air conditioner control device 19. An air passage to be used when air flows from the HVAC unit. 5 to the inside of the vehicle 1 is determined depending on in which of the gate valves 6 tic opening/closing operation is performed.

The outside-air/inside-air switching valve 7 has an opening/closing degree to be adjusted so that an opening/closing operation is performed, by the servo motor (not shown) being driven in accordance with control from the air conditioner control device 19.

The outside-air/inside-air switching valve 7 closes the air passage from the heat exchanger 4 to the HVAC unit 5 and opens the air passage from the inside of the vehicle 1 to the HVAC unit 5 when the air-conditioning mode is the inside-air circulation mode. With this operation, air does not flow from the heat exchanger 4 to the HVAC unit 5, but air flows from the inside of the vehicle 1 to the HVAC unit 5. In other words, when the air-conditioning mode is the inside-air circulation mode, the HVAC unit 5 takes in the inside air.

The outside-air/inside-air switching valve 7 closes the air passage from the inside of the vehicle 2 to the HVAC unit 5 and opens the air passage from the heat exchanger 4 to the HVAC unit 5 when the air-conditioning mode is the outside-air introduction mode. With this operation, air does not flow from the inside of the vehicle 1 to the HVAC unit 5, but air flows from the heat exchanger 4 to the HVAC unit 5. In other words, when the air-conditioning mode is the outside-air introduction mode, the HVAC unit 5 takes in air flowing from the outside of the vehicle 1 to pars through the heat exchanger 4 after passing through the air-supply passage 2.

The blower fan 8 operates only when the air-conditioning mode is the outside-air introduction mode. Through the operation of the blower fan 8, the inside air is discharged from the exhaust passage 3 to the outside of the vehicle 1 after passing through the heat exchanger 4. The operation of the blower fan 8 is controlled so as to maintain an air pressure outside the vehicle 1 and an air pressure inside the vehicle 1 at the same level.

The fog information detector 50 detects tog information for determining whether or not a windshield of the vehicle 1 is fogged. Specifically, the fog information detector 50 includes the outdoor-side thermometer 10 configured to detect a temperature outside the vehicle 1, and the indoor-side thermo-hygrometer 11 configured to detect, a temperature and humidity inside the vehicle 1.

The air pollution level detector 60 detects each of a pollution level of the outside air and a pollution level of the inside air. Specifically, the air pollution level detector 60 includes the dust sensor 12, the outdoor-side odor sensor 13, the indoor-side odor sensor 14, the VOC sensor 15, the NOx sensor 16, the SOx sensor 17, and the CO2 sensor 18.

The dust sensor 12 detects a dust concentration in the outside air. The outdoor-side odor sensor 13 detects an odor concentration in the outside air. The NOx sensor 16 detects a concentration of nitrogen oxides (NOx) in the outside air. The SOx sensor 17 detects a concentration of sulfur oxides (SOx) in the outside air.

The indoor-side odor sensor 14 detects an odor concentration in the inside air. The VOC sensor 15 detects a concentration of volatile organic compounds (VOC) in the inside air. The CO2 sensor 18 detects a concentration of carbon dioxide (CO2) in the inside air.

Each of the outdoor-side thermometer 10, the dust sensor 12, the outdoor-side odor sensor 13, the NOx sensor 16, and the SOx sensor 17 may be arranged in any position as long as each sensor can be brought into contact with the outside air. For example, those sensors are arranged in a hood of the vehicle 1, or at an inlet of the air-supply passage 2. When those sensors are already arranged in the vehicle 1 for other uses, the sensors already arranged may be used.

Each of the indoor-side thermo-hygrometer 11, the indoor-side odor sensor 14, the VOC sensor 15, and the CO2 sensor 18 may be arranged in any position as long as each sensor can be brought into contact with the inside air. For example, those sensors are arranged in a console of the vehicle 1, or at an inlet of the exhaust passage 3. When those sensors are already arranged in the vehicle 1 for other uses, the sensors already arranged may be used.

The air-conditioning control device 9 controls air conditioning by switching an air-conditioning mode between an inside-air circulation mode, in which the inside air is circulated, and an outside-air introduction mode, in which the outside air is introduced into the inside of the vehicle 1 and the inside air is discharged to the outside of the vehicle 1.

Specifically, when the air-conditioning mode is the outside-air introduction mode, the air-conditioning control device 9 compares the pollution level of the outside air, which is acquired from the air pollution level detector 60, with an outside-air pollution level threshold value for determining whether or not to switch the air-conditioning mode from the outside-air introduction mode to the inside-air circulation mode. As a result of the comparison, when the pollution level of the outside air exceeds the outside-air pollution level threshold value, the air-conditioning control device 9 switches the air-conditioning mode from the outside-air introduction mode to the inside-air circulation mode.

When the air-conditioning mode is the inside-air circulation mode, the air-conditioning control device 9 compares the pollution level of the inside air, which is acquired from the air pollution level detector 60, with an inside-air pollution level threshold value for determining whether or not to switch the air-conditioning mode from the inside-air introduction mode to the outside-air introduction mode. As a result of the comparison, when the pollution level of the inside air exceeds the inside-air pollution level threshold value, the air-conditioning control device 9 switches the air-conditioning mode from the inside-air circulation mode to the outside-air introduction mode.

Further, when the air-conditioning mode is the inside-air circulation mode, the air-conditioning control device 9 determines whether or not the windshield is fogged, based on the fog information acquired from the fog information detector 50. As a result of the determination, when determining that the windshield is fogged, the air-conditioning control device 9 switches the air-conditioning mode from the inside-air circulation mode to the outside-air introduction mode.

The air conditioner control device 19 controls the operation of each of the HVAC unit 5, the gate valves 6, and the outside-air/inside-air switching valve 7.

The air cleaner 20 cleans the inside air to be circulated, when the air-conditioning mode is the inside-air circulation mode. In other words, the air cleaner 20 cleans air flowing through the HVAC unit 5. For example, the air cleaner 20 uses ions generated by high-voltage discharge to decompose odor components in the air or adsorb dust in the air, for example, to thereby clean the air. With this operation, when the air-conditioning mode is the inside-air circulation mode, unpleasant components contained in the inside air are removed, and hence it is possible to maintain a comfortable environment inside the vehicle 1.

The vehicle control device 21 controls driving of the vehicle 1 by switching a driving mode of the vehicle 1 between an automatic driving mode, in which autonomous driving of the vehicle 1 is performed in place of a driver of the vehicle, and a manual driving mode, in which the driver himself or herself, drives the vehicle 1. For example, when the driving mode of the vehicle 1 is the automatic driving mode, the vehicle control device 21 controls driving of. the vehicle 1 based on detection results obtained by various sensors (not shown), which are arranged in the vehicle 1 to detect situations around the vehicle.

Next, the air-conditioning system according to the first embodiment is further described with reference to FIG. 2. In FIG. 2, the air-conditioning control device 9 is connected fee each of the air conditioner control device 19, the air cleaner 20, the vehicle control device 21, the heat exchange and ventilation device 30, the fog information detector 50, end the air pollution level detector 60 in a manner that allows communication therebetween.

The air conditioner control device 19 is connected to each of the HVAC unit 5, the gate valves 6, and the outside-air/inside-air switching valve 7 in a manner that allows communication therebetween. When the air-conditioning control device 9 has chosen any one of the inside-air circulation mode and the outside-air introduction mode as the air-conditioning mode, the air conditioner control device 19 controls each of the HVAC unit 5, the gate valves 6, and the outside-air/inside-air switching valve 7 in accordance with the chosen mode.

For example, each of the air-conditioning control device 9, the air conditioner control device 19, and the vehicle control device 21 is implemented by a microcomputer configured to execute arithmetic processing, a read only memory (ROM) configured to store program data, fixed value data, and other such data, a random access memory (RAM), in which data stored therein is updated to be sequentially rewritten, and others. Further, for example, each or the air-conditioning control device 9, the air conditioner control device 19, and the vehicle control device 21 is an integrated circuit, and is formed by, for example, an application specific integrated circuit (ASIC) or a field programmable gate array (FPGA). The function of each of the air-conditioning control device 9, the air conditioner control device 19, and the vehicle control device 21 may be integrated into a single integrated circuit.

The air-conditioning control device 9 stores, for each sensor, a threshold value to be compared with a detection value obtained by each of the dust sensor 12, the outdoor-side odor sensor 13, the indoor-side odor sensor 14, the VOC sensor 15, the NOx sensor 16, the SOx sensor 17, and the CO2 sensor 18. Specifically, the air-conditioning control device 9 stores a threshold value corresponding to the dust sensor 12 (hereinafter referred to as "dust threshold value"), a threshold value corresponding to the outdoor-side odor sensor 13 (hereinafter referred to as "outdoor-aide odor threshold value"), a threshold value corresponding to the indoor-side odor sensor 14 (hereinafter referred to as "indoor-side odor threshold value"), a threshold value corresponding to the VOC sensor 15 (hereinafter referred to as "VOC threshold value"), a threshold value corresponding to the NOx sensor 16 (hereinafter referred to as "NOx threshold value"), a threshold value corresponding to the SOx sensor 17 (hereinafter referred to as "SOx threshold value"), and a threshold value corresponding to the CO2 sensor 18 (hereinafter referred to as "CO2 threshold value").

The threshold value stored for each of the sensors is set in advance, and is set to, for example, a value at which a substance to be detected by the sensor can be sensed by humans, or to an environmental standard value corresponding to the substance to be detected by the sensor.

As an example, the size or a particle diameter of dust that is easy for humans to sense is equal to or larger than 10 μm. Most of the dust having a particle diameter of 10 μm or larger can be removed by a filter of an air conditioner. Thus, dust having a particle diameter of smaller than 10 μm is set as dust to be detected by the dust sensor 12. Dust having a plurality of types of particle diameters may be set as dust to be detected by the dust sensor 12. In this case, an influence exerted on human bodies differs depending on a particle diameter of dust, and hence a threshold value is set for each type of particle diameter.

As an example, the VOC sensor 15 detects a concentration of a chemical substance, for example, formaldehyde, toluene, xylene, ethylbenzene, styrene, dibutyl phthalate, Letradecane, bis(2-ethylhexyl)phthalate, or acetaldehyde. A plurality of types of chemical substances may be set as substances to be detected by the VOC sensor 15. In this case, a concentration at which an influence is exerted on human bodies differs depending on the type cf chemical substance, and hence a threshold value is set for each type of chemical substance.

Figure 3:
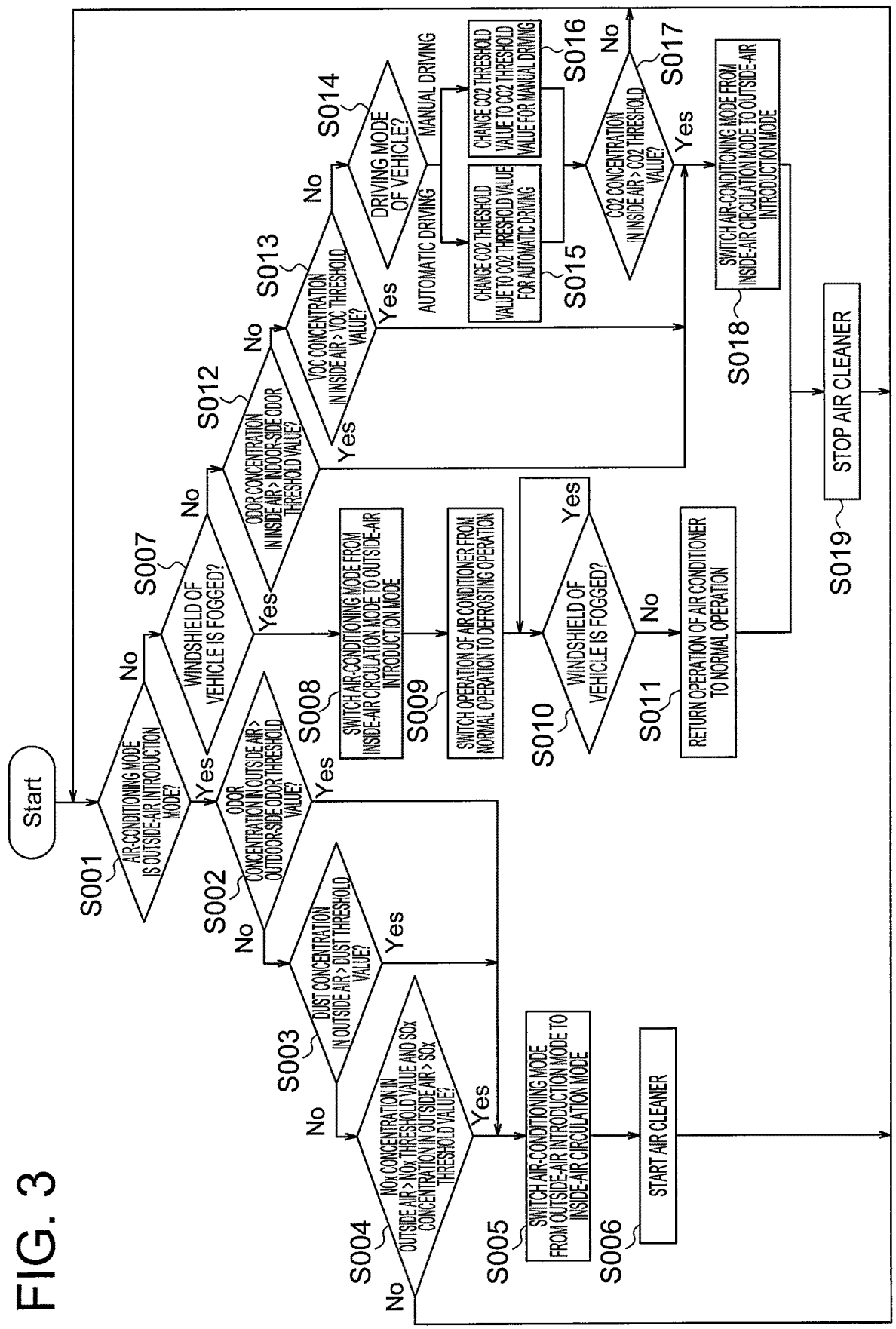
FIG. 3 is a flowchart for illustrating a series of procedures of processing of the air-conditioning system according to the first embodiment of the present invention.

Next, a series of operations of the air-conditioning system according to the first, embodiment is described with reference to FIG. 3. FIG. 3 is a flowchart for illustrating a series of procedures of processing of the air-conditioning system according to the first embodiment of the present invention.

In Step S001, the air-conditioning control device 9 acquires an operation state of the air conditioner 40 from the air conditioner control device 19, and determines based on the acquired operation state whether or not the air-conditioning mode is the outside-air introduction mode. When it is determined that, the air-conditioning mode is the outside-air introduction mode, the processing proceeds to Step S002. When the air-conditioning mode is not the outside-air introduction mode, that is, when the air-conditioning mode is the inside-air circulation mode, the processing proceeds to Step S007.

In Step S002, the air-conditioning control device 9 acquires front the outdoor-side odor sensor 13 the odor concentration in the outside air, and determines whether or not the acquired odor concentration exceeds the outdoor-side odor threshold value. When it is determined that the odor concentration exceeds the outdoor-side odor threshold value, the processing proceeds to Step S005. When it is determined that the odor concentration does net exceed the outdoor-side odor threshold value, the processing proceeds to Step S003.

In Step S003, the air-conditioning control device 9 acquires from the dust sensor 12 the dust concentration in the outside air, and determines whether or not the acquired dust, concentration exceeds the dust threshold value. When it is determined that the dust concentration exceeds the dust threshold value, the processing proceeds to Step S005. When it is determined that the dust concentration does not exceed the dust threshold value, the processing proceeds to Step S004.

In Step S004, the air-conditioning control device 9 acquires from the NOx sensor 16 and the SOx sensor 17 the NOx concentration and the SOx concentration in the outside air, and determines whether or not the acquired NOx concentration exceeds the NOx threshold value and the acquired SOx concentration exceeds the SOx threshold value. When it is determined that the NOx concentration exceeds the NOx threshold value and the SOx concentration exceeds the SOx threshold value, the processing proceeds to Step S005. Meanwhile, when it is determined that the NOx concentration does not exceed the NOx threshold value or the SOx concentration does not exceed the SOx threshold value, the processing returns to Step S001, and the processing of Step S001 and the subsequent steps are performed again.

In Step S005, the air-conditioning control device 9 switches the air-conditioning mode from the outside-air introduction mode to the inside-air circulation mode, and the processing proceeds to Step S006. Specifically, the air-conditioning control device 9 instructs the air conditioner control device 19 to use the outside-air/inside-air switching valve 7 to close the air passage from the heat exchanger 4 to the HVAC unit 5 and open the air passage from the inside of the vehicle 1 to the HVAC unit 5, and stops the blower fan 8.

As can be understood from Step S001, Step S002, and Step S005 described above, when the odor concentration in the outside air, which is acquired from the outdoor-side odor sensor 13 as the pollution level of the outside air, exceeds the outdoor-side odor threshold value as the outside-air pollution level threshold value, the air-conditioning control device 9 switches the air-conditioning mode from the outside-air introduction mode to the inside-air circulation mode.

Further, as can be understood from Step S001, Step S003, and Step S005 described above, when the dust concentration in the outside air, which is acquired from the dust sensor 12 as the pollution level of the outside air, exceeds the dust threshold value as the outside-air pollution level threshold value, the air-conditioning control device 9 switches the air-conditioning mode from the outside-air introduction mode to the inside-air circulation mode.

Further, as can be understood from Step S001, Step S004, and Step S005 described above, the air-conditioning control device 9 compares the NOx concentration and the SOx concentration, which are acquired from the NOx sensor 16 end the SOx sensor 17 as the pollution level of the outside air, with the NOx threshold value and the SOx threshold value as the outside-air pollution level threshold values, respectively. As a result of the comparison, when the NOx concentration exceeds the NOx threshold value and the SOx concentration exceeds the SOx threshold value, the air-conditioning control device 9 switches the air-conditioning mode from the outside-air introduction mode to the inside-air circulation mode.

In Step S006, the air-conditioning control device 9 starts the air cleaner 20. Then, the processing returns to Step S001, and the processing of Step S001 and the subsequent steps are performed again.

As described above, the air-conditioning control device 9 switches the air-conditioning mode from the outside-air introduction mode to the inside-air circulation mode, and then starts the air cleaner 20.

In Step S007, the air-conditioning control device 9 determines whether or not the windshield of the vehicle 1 is fogged.

Figure 4:
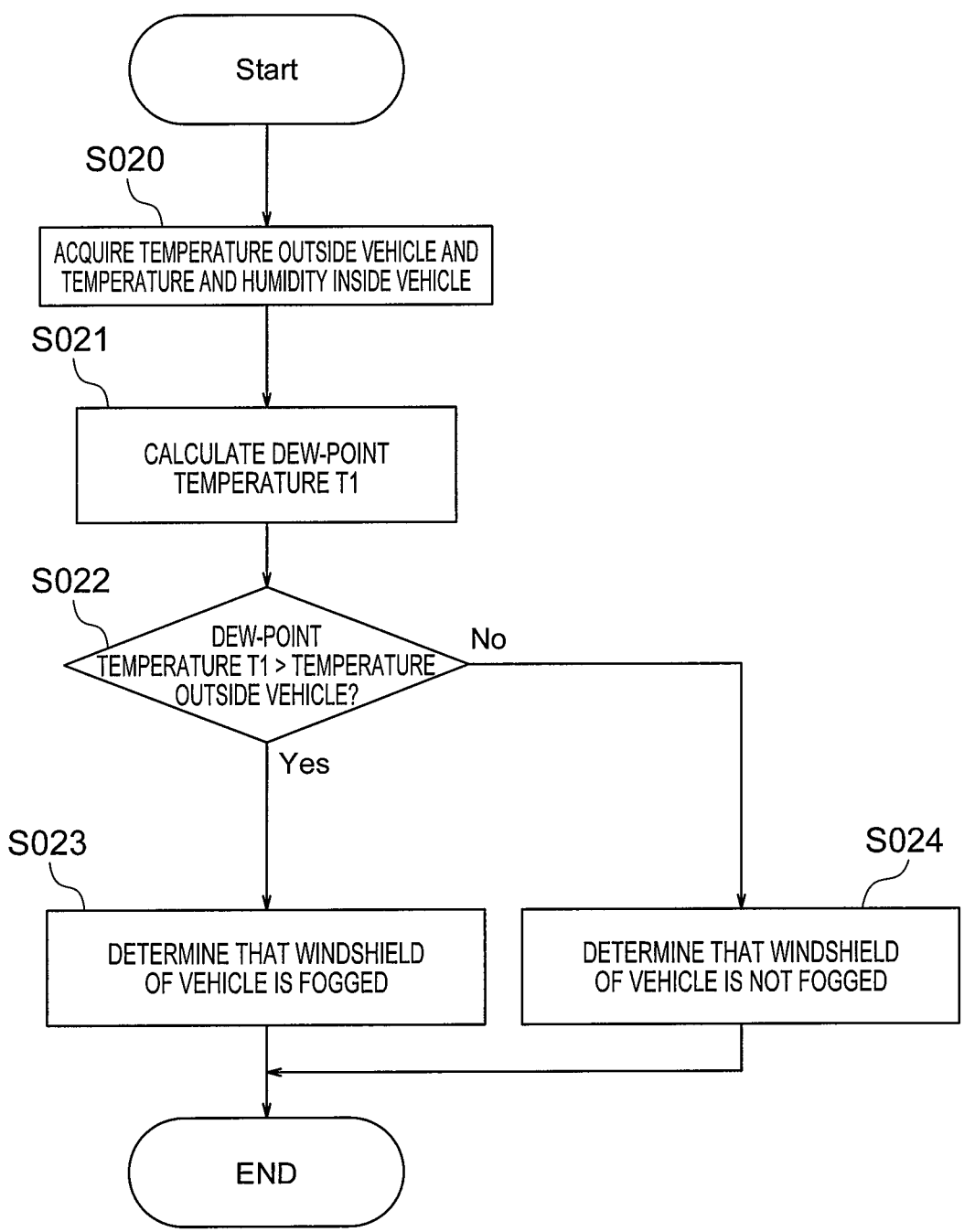
FIG. 4 is a flowchart for illustrating a series of procedures of processing in which an air-conditioning control device in the first embodiment of the present invention determines whether or not a windshield of the vehicle is fogged.

Now, a specific example of a method of determining whether or not the windshield of the vehicle 1 is fogged is described with reference to FIG. 4. FIG. 4 is a flowchart for illustrating a series of procedures of processing in which the air-conditioning control device 9 in the first embodiment of the present invention determines whether or not the windshield of the vehicle 1 is fogged.

In Step S020, the air-conditioning control device 9 acquires, from the outdoor-side thermometer 10 and the indoor-side thermo-hygrometer 11, the temperature outside the vehicle 1 and the temperature and humidity inside the vehicle 1, and the processing proceeds to Step S021.

In Step S021, the air-conditioning control device 9 calculates a dew-point temperature T1 of air based on the temperature and humidity inside the vehicle 1, which is acquired in Step S020, and the processing proceeds to Step S022.

In Step S022, the air-conditioning control device 9 determines whether or not the dew-point temperature T1 calculated in Step S021 is higher than the temperature outside the vehicle 1, which is acquired in Step S020. When it is determined that the dew-point temperature T1 is higher than the temperature outside the vehicle 1, the processing proceeds to Step S023. When it is determined that the dew-point temperature T1 is equal to or lower than the temperature outside the vehicle 1, the processing proceeds to Step S024.

In Step S023, the air-conditioning control device 9 determines that the windshield is fogged, and the processing ends. In other words, the air-conditioning control device 9 is configured to determine that the windshield is fogged when the dew-point temperature T1 is higher than the temperature outside the vehicle 1 because dew condensation or ice is conceivably formed on the windshield.

In Step S024, the air-conditioning control device 9 determines that the windshield is not fogged, and the processing ends.

As can be understood from Step S020 to Step S024 described above, the air-conditioning control device 9 determines whether or not the windshield is fogged based on the temperature outside the vehicle 1 and the temperature and humidity inside the vehicle 1, which are acquired from the outdoor-side thermometer 10 and the indoor-side thermo-hygrometer 11 as the fog information.

Returning to the description of FIG. 3, when it is determined in Step S007 that the windshield of the vehicle 1 is fogged, the processing proceeds to Step S008. When it is determined in Step S007 that the windshield is not fogged, the processing proceeds to Step S012.

In Step S008, the air-conditioning control device 9 switches the air-conditioning mode from the inside-air circulation mode to the outside-air introduction mode, and the processing proceeds to Step S009. Specifically, the air-conditioning control device 9 instructs the air conditioner control device 19 to use the outside-air/inside-air switching valve 7 to close the air passage from the inside of the vehicle 1 to the HVAC unit 5 and open the air passage from the heat exchanger 4 to the HVAC unit 5, and operates the blower fan 8.

In Step S009, the air-conditioning control device 9 switches the operation of the air conditioner 40 from a normal operation to a defrosting operation, and the processing proceeds to Step S010. Specifically, the air-conditioning control device 9 instructs the air conditioner control device 19 to control the gate valves 6 to perform the defrosting operation. The defrosting operation is an operation for removing the fog of the windshield, which is an operation that has been known heretofore.

In Step S010, the air-conditioning control device 9 performs processing similar to that of Step S007 to determine again whether or not the windshield of the vehicle 1 is fogged. In other words, in Step S010, it is checked whether or not the fog of the windshield is removed by switching the operation of the air conditioner 40 to the defrosting operation in Step S009.

When it is determined in Step S010 that the windshield of the vehicle 1 is fogged, the above-mentioned determination processing is performed again. When it is determined in Step S010 that the windshield is not fogged, the processing proceeds to Step S011. In other words, the defrosting operation is continuously performed until it is determined that the windshield is not fogged.

In Step S011, the air-conditioning control device 9 returns the operation of the air conditioner 40 to the normal operation, and the processing proceeds to Step S019.

In Step S012, the air-conditioning control device 9 acquires from the indoor-side odor sensor 14 the odor concentration in the inside air, and determines whether or not the acquired odor concentration exceeds the indoor-side odor threshold value. When it is determined that the odor concentration exceeds the indoor-side odor threshold value, the processing proceeds to Step S018. When it is determined that the odor concentration does not exceed the indoor-side odor threshold value, the processing proceeds to Step S013.

In Step S013, the air-conditioning control device 9 acquires from the VOC sensor 15 the VOC concentration in the inside air, and determines whether or not the acquired VOC concentration exceeds the VOC threshold value. When it is determined that the VOC concentration exceeds the VOC threshold value, the processing proceeds to Step S018. When it is determined that the VOC concentration does not exceed the VOC threshold value, the processing proceeds to Step S014.

In Step S014, the air-conditioning control device 9 acquires the driving mode of the vehicle 1 from the vehicle control device 21, and determines whether or not the acquired driving mode is the automatic driving mode, or the manual driving mode. When it is determined that the driving mode is the automatic driving mode, the processing proceeds to Step S015. When the driving mode is the manual driving mode, the processing proceeds to Step S016.

In Step S015, the air-conditioning control device 9 changes the CO2 threshold value to a CO2 threshold value for automatic driving, and the processing proceeds to Step S017. In Step S016, the air-conditioning control device 9 changes the CO2 threshold value to a CO2 threshold value for manual driving, and the processing proceeds to Step S017.

The CO2 threshold value for automatic driving and the CO2 threshold value for manual driving are set in advance, and are values that are different from each other. For example, the CO2 threshold value for manual driving is set so as to be larger than the CO2 threshold value for automatic driving. As a specific example, the CO2 threshold value for automatic driving is set so as to satisfy an environmental standard for the inside of the vehicle 1. Further, it is generally known that, when the driver of the vehicle 1 is concentrating on driving, the driver does not feel uncomfortable even when the CO2 concentration has a value equal to or larger than the environmental standard for the inside of the vehicle 1. Thus, the CO2 threshold value for manual driving is set to a value that is equal to or larger than the environmental standard for the inside of the vehicle 1 and at which the driver does not feel uncomfortable even when the driver is concentrating on driving.

In Step S017, the air-conditioning control device 9 acquires the CO2 concentration in the inside air from the CO2 sensor 18, and determines whether or not the acquired CO2 concentration exceeds the CO2 threshold value that has been changed in Step S015 or Step S016. When it is determined that the CO2 concentration exceeds the CO2 threshold value, the processing proceeds to Step S018. When it is determined that the CO2 concentration does not exceed the CO2 threshold value, the processing returns to Step S001, and the processing of Step S001 and the subsequent steps are performed again.

In Step S018, the air-conditioning control device 9 switches the air-conditioning mode from the inside-air circulation mode to the outside-air introduction mode, and the processing proceeds to Step S019. Specifically, the air-conditioning control device 9 instructs the air conditioner control device 19 to use the outside-air/inside-air switching valve 7 to close the air passage from the inside of the vehicle 1 to the HVAC unit 5 and open the air passage from the heat exchanger 4 to the HVAC unit 5, and operates the blower fan 8.

In Step S019, the air-conditioning control device 9 steps the air cleaner 20. Then, the processing returns to Step S001, and the processing of Step S001 and the subsequent steps are performed again.

In the first embodiment, the case in which the vehicle 1 has the automatic driving mode as the driving mode of the vehicle 1 has beer, described. However, when the vehicle 1 does not have the automatic driving mode as the driving mode of the vehicle 1, the following processing is performed. Specifically, in the flowchart of FIG. 3, when it is determined in Step S013 that the VOC concentration does not exceed the VOC threshold value, the processing of Step S014 to Step S016 is not performed, and the processing of Step S017 is performed. In this case, the CO2 threshold value to be used in Step S017 is not a variable value, but a fixed value.

In the first embodiment, the case in which the CO2 threshold value is changed based on the driving mode of the vehicle 1 has been described, but the CO2 threshold value may not be changed. Further, in the first embodiment, the case in which the indoor-side odor threshold value and the VOC threshold value are not changed has been described, but based on the driving mode of the vehicle 1, the indoor-side odor threshold value may be changed, or the VOC threshold value may be changed.

As can be understood from Step S001, Step S012, and Step S018 described above, when the odor concentration in the inside air, which is acquired from the indoor-side odor sensor 14 as the pollution level of the inside air, exceeds the indoor-side odor threshold value as the inside-air pollution level threshold value, the air-conditioning control device 9 switches the air-conditioning mode from the inside-air circulation mode to the outside-air introduction mode.

Further, as can be understood from Step S001, Step S013, and Step S018 described above, when the VOC concentration, which is acquired from the VOC sensor 15 as the pollution level of the inside air, exceeds the VOC threshold value as the inside-air pollution level threshold value, the air-conditioning control device 9 switches the air-conditioning node from the inside-air circulation mode to the outside-air introduction mode.

Further, as can be understood from Step S001, Step S017, and Step S018 described above, when the CO2 concentration, which is acquired from the CO2 sensor 18 as the pollution level of the inside air, exceeds the CO2 threshold value as the inside-air pollution level threshold value, the air-conditioning control device 9 switches the air-conditioning mode from the inside-air circulation mode to the outside-air introduction mods.

Further, as can be understood from Step S001, Step 5014, Step S015, and Step S016, the air-conditioning control device 9 acquires the driving mode from the vehicle control device 21, and changes the inside-air pollution level threshold value based on the acquired driving mode. In this case, the air-conditioning control device 9 uses the changed inside-air pollution level threshold value to compare the acquired pollution level of the inside air with the inside-air pollution level threshold value.

The air-conditioning system according to the first embodiment described above is configured to switch the air conditioning inside the vehicle between the circulation of the inside air and the introduction of the outside air from one to another, based on the detection results obtained by the air pollution level detector configured to detect each of the pollution level of the outside air and the pollution level of the inside air.

With this configuration, the air conditioning inside the vehicle is switched between the circulation of the inside air and the introduction of the outside air from one to another in consideration of a possibility that each of the outside air and the inside air may be polluted, and hence the quality of the air inside the vehicle can be maintained in a satisfactory state. As a result, the improvement of comfortability inside the vehicle can be achieved. Further, when the pollution level in the inside air has reached a certain level, the outside air is introduced to ventilate the inside of the vehicle, and hence unnecessary ventilation can be suppressed.

Further, in addition to the configuration described above, the air-conditioning system described above further includes the heat exchanger configured to exchange heat between the outside air introduced into the inside of the vehicle and the inside air discharged to the outside of the vehicle, when the air-conditioning mode is the outside-air introduction mode.

With this configuration, a ventilation loss at the time when the outside air is introduced to ventilate the inside of the vehicle is reduced, and as a result, energy consumed by the air conditioner can be reduced. In particular, when the air-conditioning system described above is applied to an electric vehicle having a drive motor and a battery mounted thereto, electric power consumed by the battery can be suppressed. As a result, it is possible to prevent a cruising distance of the electric vehicle from being decreased. As described above, the air-conditioning system described above contributes to preventing the cruising distance from being decreased while the comfortability inside the electric vehicle is maintained.

REFERENCE SIGNS LIST 1 vehicle, 2 air-supply passage, 3 exhaust passage, 4 heat exchanger, 5 HVAC unit, 6 gate valve, 7 outside-air/inside-air switching valve, 8 blower fan, 9 air-conditioning control device, 10 outdoor-side thermometer, 11 indoor-side thermo-hygrometer, 12 dust sensor, 13 outdoor-side odor sensor, 14 indoor-side odor sensor, 15 VOC sensor, 16 NOx sensor, 17 SOx sensor, 18 CO2 sensor, 19 air conditioner control device, 20 air cleaner, 21 vehicle control device, 30 heat exchange and ventilation device, 40 air conditioner, 50 fog information detector, 60 air pollution level detector.

The invention claimed is:

1. An air-conditioning system, which is to be mounted to a vehicle, the air-conditioning system comprising:
   an air pollution level detector configured to detect each of a pollution level of outside air, which is air outside the vehicle, and a pollution level of inside air, which is air inside the vehicle; and
   an air-conditioning control device configured to control air conditioning by switching an air-conditioning mode of the vehicle between an inside-air circulation mode, in which the inside air is circulated, and an outside-air introduction mode, in which the outside air is introduced into an inside of the vehicle and the inside air is discharged to the outside of the vehicle,
   wherein the air-conditioning control device is configured to:
   compare, when the air-conditioning mode is the outside-air introduction mode, the pollution level of the outside air acquired from the air pollution level detector with an outside-air pollution level threshold value for determining whether to switch the air-conditioning mode from the outside-air introduction mode to the inside-air circulation mode, and when the pollution level of the outside air exceeds the outside-air pollution level threshold value, switch the air-conditioning mode from the outside-air introduction mode to the inside-air circulation mode; and compare, when the air-conditioning mode is the inside-air circulation mode, the pollution level of the inside air acquired from the air pollution level detector with an inside-air pollution level threshold value for determining whether to switch the air-conditioning mode from the inside-air circulation mode to the outside-air introduction mode, and when the pollution level of the inside air exceeds the inside-air pollution level threshold value, switch the air-conditioning mode from the inside-air circulation mode to the outside-air introduction mode, wherein the air-conditioning control device is configured to acquire a driving mode of the vehicle from a vehicle control device configured to control driving of the vehicle by switching the driving mode between an automatic driving mode, in which autonomous driving of the vehicle is performed in place of a driver of the vehicle, and a manual driving mode, in which the driver drives the vehicle, and change the inside-air pollution level threshold value based on the acquired driving mode.

2. The air-conditioning system according to claim 1, further comprising a heat exchanger configured to exchange heat between the outside air introduced into the inside of the vehicle and the inside air discharged to the outside of the vehicle, when the air-conditioning mode is the outside-air introduction mode.

3. The air-conditioning system according to claim 1, further comprising a fog information detector configured to detect fog information for determining whether a windshield of the vehicle is fogged, wherein, when the air-conditioning mode is the inside-air circulation mode, the air-conditioning control device determines whether the windshield is fogged based on the fog information acquired from the fog information detector, and when determining that the windshield is fogged, switches the air-conditioning mode from the inside-air circulation mode to the outside-air introduction mode.

4. The air-conditioning system according to claim 3, wherein the fog information detector includes:

an outdoor-side thermometer configured to detect a temperature of the outside of the vehicle; and an indoor-side thermo-hygrometer configured to detect a temperature and humidity of the inside of the vehicle, and wherein the air-conditioning control device is configured to determine whether the windshield is fogged based on the temperature of the outside of the vehicle and the temperature and humidity of the inside of the vehicle, which are acquired from the outdoor-side thermometer and the indoor-side thermo-hygrometer as the fog information.

5. The air-conditioning system according to claim 1, wherein the air pollution level detector includes an outdoor-side odor sensor configured to detect an odor concentration in the outside air, and wherein, when the odor concentration acquired from the outdoor-side odor sensor as the pollution level of the outside air exceeds an outdoor-side odor threshold value as the outside-air pollution level threshold value, the air-conditioning control device switches the air-conditioning mode from the outside-air introduction mode to the inside-air circulation mode.

6. The air-conditioning system according to claim 1, wherein the air pollution level detector includes a dust sensor configured to detect a dust concentration in the outside air, and wherein, when the dust concentration acquired from the dust sensor as the pollution level of the outside air exceeds a dust threshold value as the outside-air pollution level threshold value, the air-conditioning control device switches the air-conditioning mode from the outside-air introduction mode to the inside-air circulation mode.

7. The air-conditioning system according to claim 1, wherein the air pollution level detector includes:

a NOx sensor configured to detect a NOx concentration in the outside air; and a SOx sensor configured to detect a SOx concentration in the outside air, and wherein, when the NOx concentration which is acquired from the NOx sensor as the pollution level of the outside air, exceeds a NOx threshold value as the outside-air pollution level threshold value and the SOx concentration which is acquired from the SOx sensor as the pollution level of the outside air, exceeds a SOx threshold value as the outside-air pollution level threshold value, the air-conditioning control device switches the air-conditioning mode from the outside-air introduction mode to the inside-air circulation mode.

8. The air-conditioning system according to claim 1, wherein the air pollution level detector includes an indoor-side odor sensor configured to detect an odor concentration in the inside air, and wherein, when the odor concentration acquired from the indoor-side odor sensor as the pollution level of the inside air exceeds an indoor-side odor threshold value as the inside-air pollution level threshold value, the air-conditioning control device switches the air-conditioning mode from the inside-air circulation mode to the outside-air introduction mode.

9. The air-conditioning system according to claim 1, wherein the air pollution level detector includes a VOC (volatile organic compounds) sensor configured to detect a VOC concentration in the inside air, and wherein, when the VOC concentration acquired from the VOC sensor as the pollution level of the inside air exceeds a VOC threshold value as the inside-air pollution level threshold value, the air-conditioning control device switches the air-conditioning mode from the inside-air circulation mode to the outside-air introduction mode.

10. The air-conditioning system according to claim 1, wherein the air pollution level detector includes a CO2 sensor configured to detect a CO2 concentration in the inside air, and wherein, when the CO2 concentration acquired from the CO2 sensor as the pollution level of the inside air exceeds a CO2 threshold value as the inside-air pollution level threshold value, the air-conditioning control device switches the air-conditioning mode from the inside-air circulation mode to the outside-air introduction mode.

11. The air-conditioning system according to claim 1, further comprising an air cleaner configured to clean the inside air to be circulated, when the air-conditioning mode is the inside-air circulation mode, wherein the air-conditioning control device is configured to switch the air-conditioning mode from the outside-air introduction mode to the inside-air circulation mode, and then start the air cleaner.

* * * * *